United States Patent [19]
Williams et al.

[11] Patent Number: 5,802,363
[45] Date of Patent: Sep. 1, 1998

[54] BIOS DYNAMIC EMULATION OF MULTIPLE DISKETTES FROM A SINGLE MEDIA

[75] Inventors: Donald D. Williams, Boca Raton; Stanley L. Merkin, Lakeworth; Charles R. Dart, II, Boca Raton, all of Fla.

[73] Assignee: International Business Machines Corporation, Armonk, N.Y.

[21] Appl. No.: 803,289

[22] Filed: Feb. 20, 1997

Related U.S. Application Data

[63] Continuation of Ser. No. 313,710, Sep. 27, 1994, abandoned.
[51] Int. Cl.$^6$ ................................................. G06F 9/445
[52] U.S. Cl. ................................................. 395/652
[58] Field of Search ................................................. 395/652

[56] References Cited

U.S. PATENT DOCUMENTS

| | | | |
|---|---|---|---|
| 5,136,711 | 8/1992 | Hugard et al. | 395/700 |
| 5,418,918 | 5/1995 | Vander Kamp et al. | 395/700 |
| 5,432,935 | 7/1995 | Kato et al. | 395/700 |
| 5,459,867 | 10/1995 | Adams et al. | 395/700 |
| 5,475,845 | 12/1995 | Orton et al. | 395/700 |

OTHER PUBLICATIONS

Business Wire, Inc. (Nov. 11, 1994) Announcement to: Business Editors & Computer/High-Tech Writers.
Contents, CD-ROM Professional, vol. 8, No. 7, (Jul. 1995) Special Feature: Staffing For CD-ROM.
Contents, CD-ROM Professional, vol. 8, No. 8, (Aug. 1995) Special Feature: Windows 95, CD-ROM and Multimedia.
ISO 9660:1988(E) — International Standard.

*Primary Examiner*—James P. Trammell
*Assistant Examiner*—John Q. Chavis
*Attorney, Agent, or Firm*—Bernard D. Bogdon

[57] ABSTRACT

A personal computer is BIOS configured to boot from an installed CD-ROM storing multiple operating systems in different partitions of the medium. The computer is initially booted from a user selected or default partition emulating a logical drive. With the original boot partition maintained active, emulation of additional partitions as other drives is performed when needed. This is accomplished in BIOS with multiple device tables, each dynamically associated with a logical drive letter. Hence, the system files found in only the original boot partition remain available to the system when other logical drives are called.

8 Claims, 10 Drawing Sheets

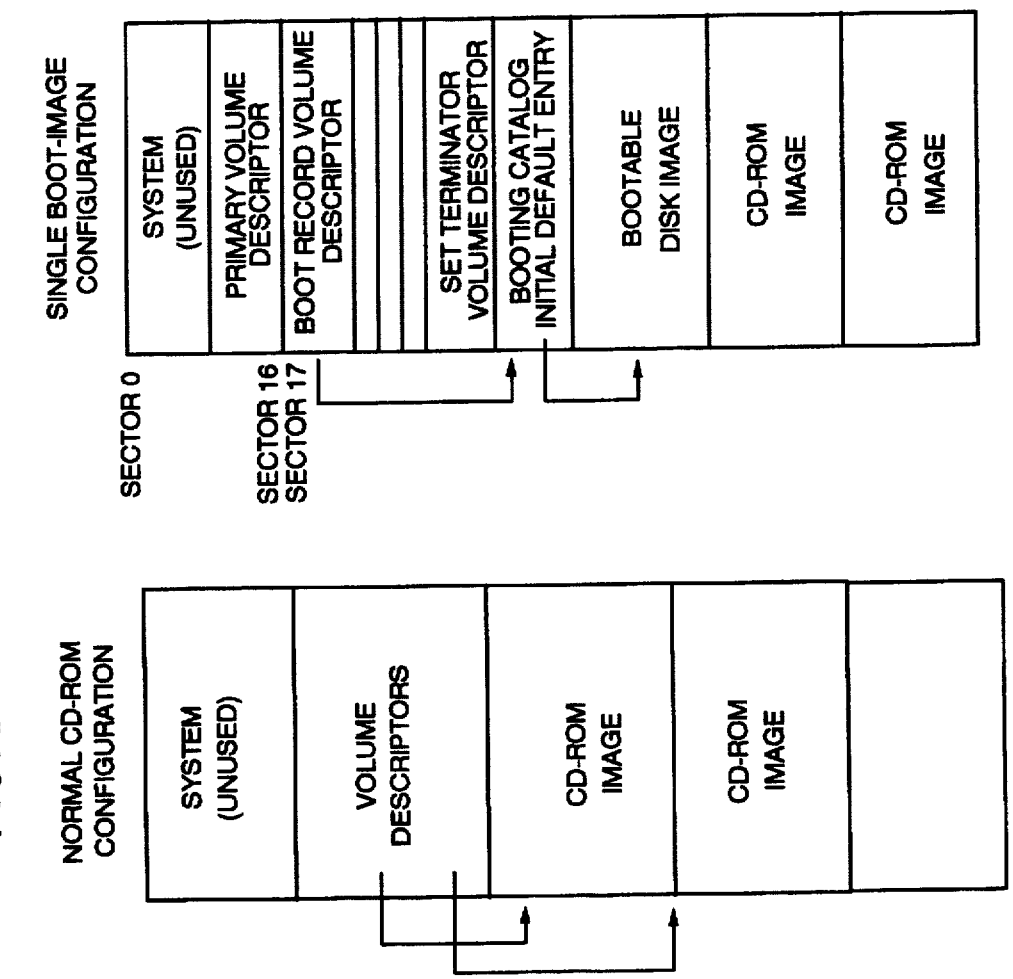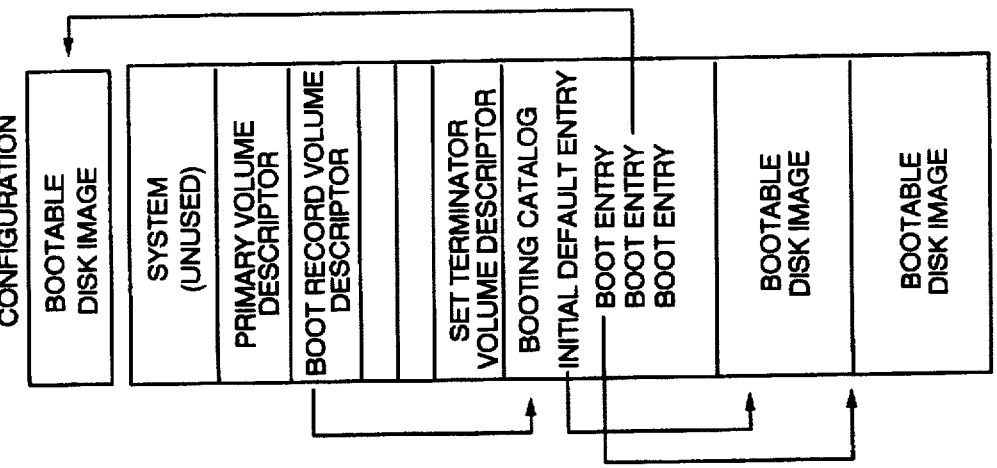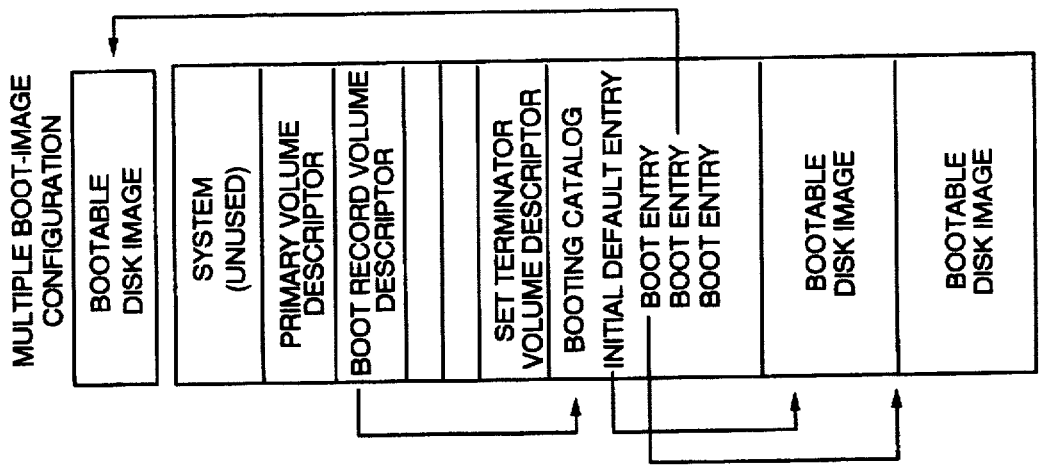

BIOS DYNAMIC EMULATION OF MULTIPLE DISKETTES FROM A SINGLE MEDIA

The application is a continuation of application Ser. No. 08/313,710, filed Sep. 27, 1994, now abandoned.

CROSS-REFERENCES TO RELATED APPLICATIONS

The subject matter presented herein relates to inventions described in the following applications, all filed on even date and under common ownership herewith: Williams, BIOS EMULATION OF A HARD FILE IMAGE AS A DISKETTE, U.S. Ser. No. 08/313,709, now U.S. Pat. No. 5,692,190 (BC9-94-130); Williams, DATA PROCESSOR HAVING BIOS DECRYPTION OF EMULATED MEDIA IMAGES, U.S. Ser. No. 08/312,748, now U.S. Pat. No. 5,652,868 (BC9-94-132); and Williams et al., BIOS EMULATION PARAMETER PRESERVATION ACROSS COMPUTER BOOTSTRAPPING, U.S. Ser. No. 08/312,749, abandoned, now U.S. Ser. No. 08/811,329 and U.S. Pat. No. 5,694,583 (BC9-94-129).

BACKGROUND OF THE INVENTION

1. Field of the Invention

This invention relates generally to the bootstrapping sequence of a data processing system, such as a personal computer, and more particularly, to booting from a CD-ROM storage medium bearing multiple images.

2. Description of Related Art

All computers, such as the various models of personal computers, or PC's, produced by IBM Corporation, execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the PC. Booting occurs automatically when the PC is first turned on, a process called a "cold boot" or by the user while the computer is running ("warm boot").

Bootstrapping performs only two functions, the first being to run a power-on self-test, or POST, and the other to search the storage media (floppy diskette or hard disk) for the operating system it will load. These functions are controlled by firmware stored in one or more basic input-output system, or BIOS, chips inside the PC.

The POST initializes all the internal hardware and hardware connected to the PC known to it, such as memory, and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The usual types of storage media, in order of storage density, are floppy disk, hard disk storage, which are magnetic media, and more recently, CD-ROM which is an optical medium capable of storing a considerable amount of data. A CD-ROM is a "read only" medium, although magneto-optical media, capable of being written to as well as read from, are emerging. Presently, floppy disks are 5.25 or 3.5 inches in diameter, with smaller sizes now emerging, and are capable of storing up to 2.88 megabytes of data. Hard disks store considerably more data, currently in the range of up to 2 gigabits, arranged as clusters disbursed throughout the medium.

CD-ROM's have attributes of both hard disks and floppy diskettes, that is, they have the storage capacity of a hard drive and the replaceability of a diskette. CD-ROM technology currently is capable of storing more than 600 megabytes of read-only data along a continuous spiral track on a phonograph record-like optical medium. As with other disk media, the CD divides its capacity into short segments, or "large frames" for addressing. The number of such large frames varies but can reach about 315,000, each containing 2352 bytes under a defined media standard. Most of the frame contains data and the remainder is divided among a synchronization field, sector address tag field and an auxiliary field. Data stored on the CD-ROM is formatted as sectors of data comprising 800 h bytes each, and with boot record residing at a prescribed (11 h) sector in the last session on the CD. The boot record points to a boot catalog providing descriptions and locations of disk or diskette image emulations recorded on the CD-ROM, one or more of which may be bootable and may carry an operating system.

Image formats of these three types of media are hierarchical in structure, with diskette lowest and CD-ROM highest, and each medium adding regions of storage overlying the storage regions of the medium beneath it. Referring to FIG. 1, which depicts the image formats of the three media, a floppy diskette starts with a boot record, which is a short program loading the operating system into the main memory, followed by a pair of file allocation tables (FAT's) which record the file structure of the diskette (two FAT's are often provided, as shown, to perform an integrity check on stored files). Next is a root directory which records the files stored on the diskette, and finally the data storage region.

The structure of a fixed disk includes not only the same regions as found in a diskette, but precedes with a reserved region as well as a partition table which, as the first record on the disk, defines the operating boundaries constituting the logical partitions of the disk, if the disk is partitioned by the user.

A CD-ROM adds to that a table of descriptors, such as defined by ISO 9660, as the first record on the CD. How data is organized into files stored on a CD-ROM is designated by the ISO 9660 specification, which specifies, among other things, that a "Primary Volume Descriptor" must reside at sector 10 h relative to the start of a session, followed by any number of other Volume Descriptors, and then by a "Volume Descriptor Terminator." The boot catalog, following the ISO descriptors, is a directory pointing to the stored images as files as identifying image characteristics. Incorporation by reference is made herein to the ISO 9660 specification in its entirety.

The ISO 9660 specification provides, optionally, new boot capabilities for personal computers, a concept disclosed in the "El Torito" bootable CD-ROM format specification, Version 1.0, recently jointly developed and made publically available by Phoenix Technologies and IBM Corporation, the assignee of the present invention. This specification, incorporated herein by reference, describes how the BIOS boot procedure can be enhanced to support the CD-ROM using INT 13 calling conventions for enabling the CD-ROM to boot as the A drive or C drive without device drivers. In accordance with this specification, if the user selects one of the boot CD-ROM options on a setup menu, and during POST the BIOS detects the presence of a CD-ROM drive, INT 19 at the end of POST will attempt to load the operating system using the boot sequence specified in Setup. To accomplish this, the installable boot CD-ROM feature makes available one of two INT 19 functions, namely, single image and multiple image INT 19.

The single image INT 19 feature accesses the booting catalog in the CD-ROM header, verifies the existence of a boot image on the CD-ROM and reads the initial/default entry and then boots from the disk image specified in this entry. Multiple image INT 19, if instructed to boot from the CD-ROM, accesses the booting catalog, verifies, and then boots from either the image specified in the initial default entry or from one of the other images listed in the section headers and section entries that follow the initial/default entry.

Three types of CD-ROM configuration are shown in FIGS. 2(a)–2(c). In FIG. 2(a), the normal CD-ROM configuration is not bootable; it uses root directory and CD-ROM drivers to access CD-ROM images. In FIG. 2(b), a BIOS with a single boot image capability accesses the initial/default entry to access a single bootable disk image. After loading the operating system, the system can revert to standard CD-ROM drivers and the root directory to access CD-ROM images. In FIG. 2(c), a BIOS with multiple boot-image capability can access any one of a number of bootable disk images listed in the booting catalog. After loading the operating system, the system can access other items in the disk image with standard INT 13 calls or return to normal access of CD-ROM images using CD-ROM drivers and the root directory.

The operating environment is depicted in FIG. 5, wherein the right hand side is a map of the first 1M of random access main memory. The lowest address of the main memory is occupied by BIOS data, such as interrupt vectors and other machine specific operating parameters such as identification of drives and access to them through BIOS INT 13 functions. The next region of memory is occupied by the operating system, such as DOS, followed by an extended BIOS area, or BIOS EBDA entered during booting. Residing in the upper layers of the main memory are video data and firmware based BIOS which is fixed for all applications. The usual BIOS functions do not recognize a CD-ROM drive, which is instead defined by ISO-9660 device driver software residing in the operating system, as shown in FIG. 5.

In FIG. 6, in accordance with the El Torito specification, enhancements made to BIOS EBDA enable the INT 13 calls to recognize the CD-ROM and further to provide for hard disk and floppy diskette image emulations derived from the CD-ROM storage files, that is, to treat the emulation images as if they are physical drives. In this example, the CD-ROM image which is booted becomes the A (floppy diskette) drive, and the physical A drive is renamed as drive B.

An important advantage of bootable CD-ROM's in accordance with the El Torito specification is the capability of distributing multiple applications on a single medium. Multiple versions of the same application in different languages can also be distributed; the user simply boots the CD-ROM and then selects the operation system, application set, and/or language to install.

The presently described invention and those described in the copending applications, identified above, provide, among other things, enhancements to the BIOS to support booting from a CD-ROM while maintaining compatibility to prescribed standards, such as the ISO 9660 specification. More particularly, a single CD-ROM may contain multiple bootable formatted partitions, but only the first partition will be used at initial boot time. However, the problem of booting from one partition and then requiring access to one or more additional partitions on the same media emulating other logical drives can be encountered. It is possible to start a program from the boot partition and then logically replace it with another partition as another logical drive becomes needed. A problem with this solution is that the operating system may need access to system files that are available only from the initial boot partition. If system file access, such as COMMAND.COM, is attempted but not successful, catastrophic failure can occur.

DOS and other operating systems provide access to multiple images on the same physical drive via partition tables at the beginning of the medium. However, this type of implementation provides a static view of the medium. A need remains to render the ability to dynamically add and remove multiple images without restarting the operating system.

SUMMARY OF THE INVENTION

The invention provides a data processing system comprising a central processing unit (CPU), a system memory for storing data in the form of electrical signals, a first port for receiving an input device generating electrical input signals, and at least one second port for supplying electrical output signals to output devices. The CPU is of a type including a BIOS for carrying out prescribed functions including converting operating signals developed by an operating system executed by the CPU into electrical signals compatible with devices that are responsive to signals provided by the CPU to the system bus.

The data processing system further includes a drive for a non-volatile mass storage medium, such as a CD-ROM, storing multiple emulated drive images, and a system bus interconnecting the CPU, system memory, first and second ports and mass storage medium driver. To install initial emulation parameters corresponding to a default image on the medium, an initial boot is performed. In accordance with the invention, multiple device tables are stored in BIOS, each dynamically associated with a logical drive and mapping the logical drive to a selected image on the medium so as to maintain emulations of multiple images simultaneously active. Hence, multiple images can be dynamically added and removed without restarting the operating system.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING(S)

FIG. 1 is a diagram showing image formats of diskette, hard drive and CD-ROM storage media.

FIGS. 2(a)–2(c) are diagrams showing configurations of non-bootable CD-ROM, single boot image CD-ROM and multiple boot image CD-ROM, respectively.

DESCRIPTION OF THE ILLUSTRATIVE EMBODIMENT(S)

Figure 1:
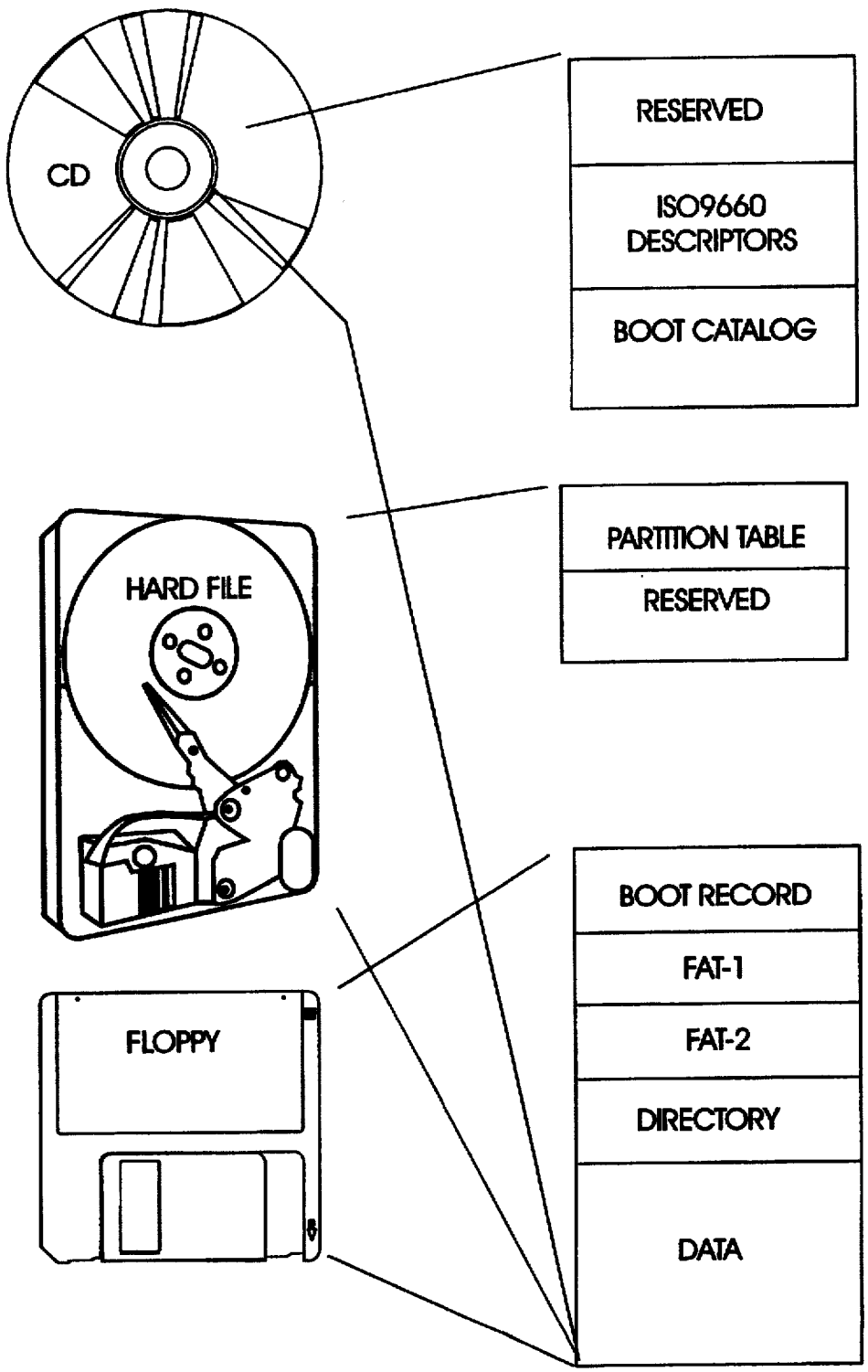
Figure 3:
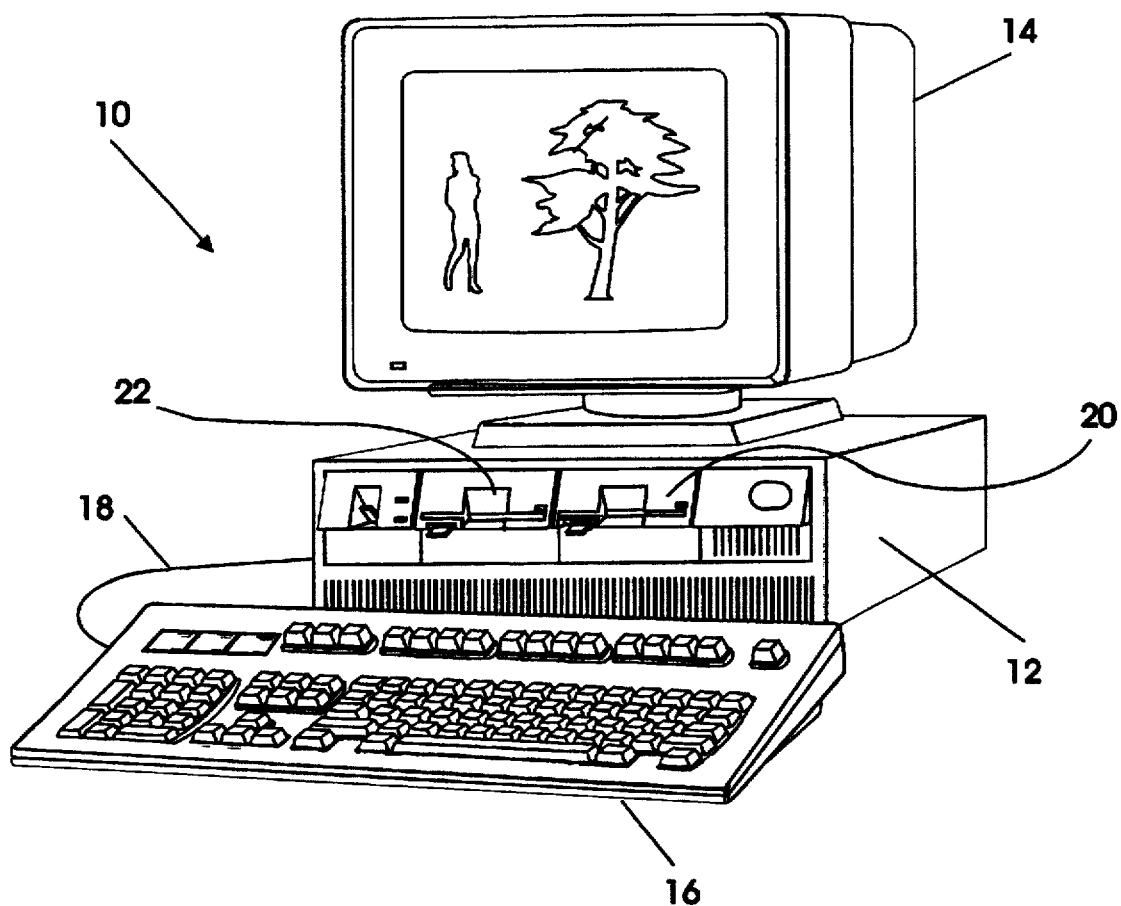
FIG. 3 is a perspective view of a personal computer system within which the present invention has application.

With reference now to the Figures, and in particular with reference to FIG. 3, a personal computer, or PC, designated 10 is of the environment to which the invention has particular utility. The computer 10 which preferably, but not necessarily, is of a type utilizing an IBM Personal Computer 2 or similar system, includes a console housing 12 within which circuit boards containing the necessary circuitry including microprocessor and BIOS chips, controllers, random access memory and other hardware are arranged. The computer will also include a display 14 and a keyboard 16 connected into the housing 12 through cable 18. Mass storage media include a hard drive within the housing and not accessible to the user, and user accessible floppy disk and CD-ROM drives 20 and 22.

Figure 4:
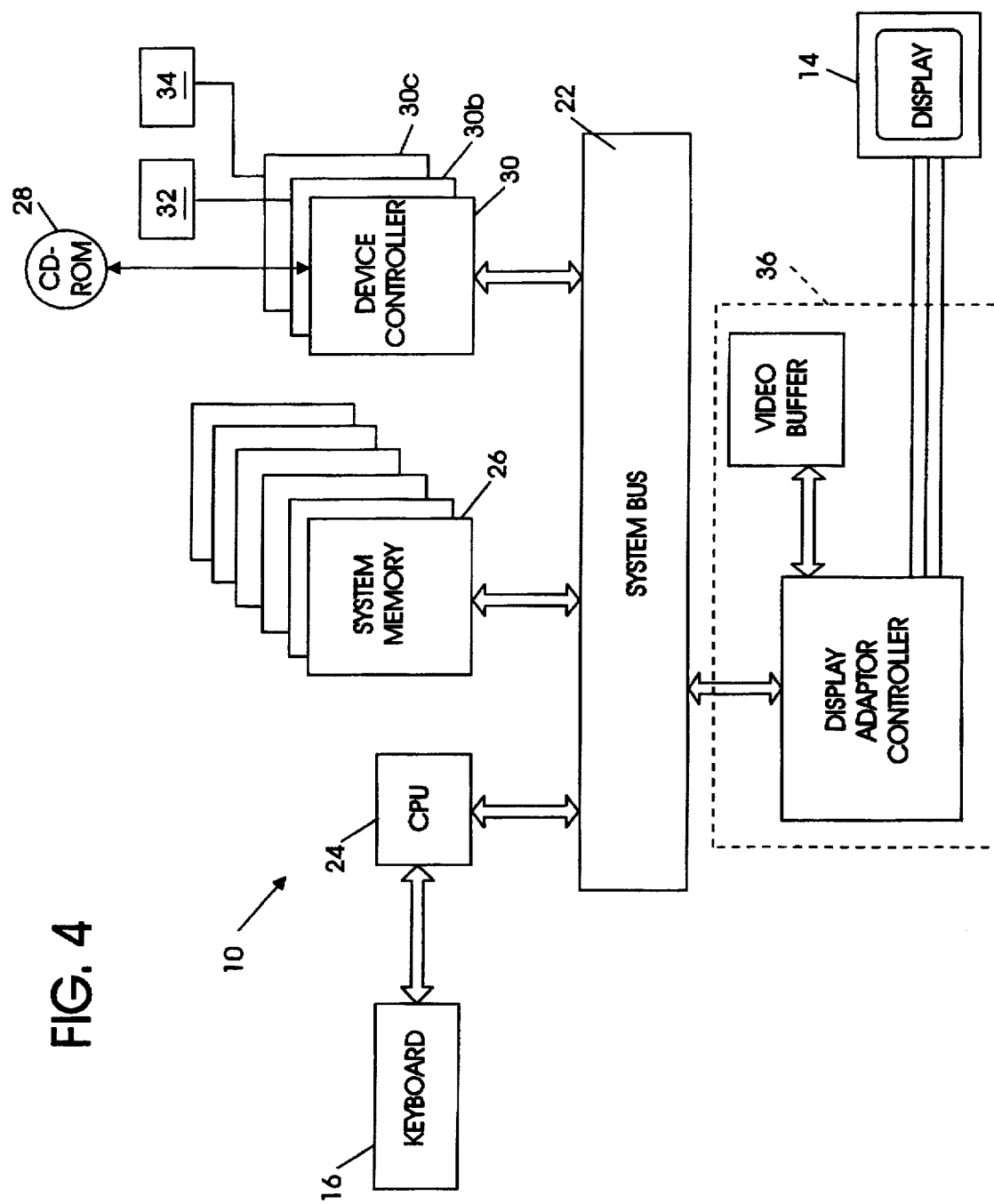
FIG. 4 is a block diagram of a personal computer based data processing system within which the invention may reside.

The architecture of computer system 10, depicted in FIG. 4, is based on a system bus 22 on which data is passed between components of the computer, including a central processing unit (CPU) 24 which preferably is based on one of the "486" family or more powerful types of processors, manufactured by Intel Corporation or others, executes programs stored in main or system memory 26 and manipulates data stored in the same memory. Data, including multimedia, may be stored in CD-ROM 28 and accessed by CPU 24 per ISO 9660 specifications through a device controller 30 connected to system bus 22. Other data are stored in floppy and hard disk drives 32 and 34 for access by the CPU 24 through corresponding controllers 30b and 30c. Display 14 is connected to the system bus 22 through a video controller 36.

Preferably, the CD-ROM is bootable, as described previously, and in the invention is formatted in accordance with the El Torito bootable CD-ROM format specification. The bootable CD-ROM format incorporated by the invention maintains compatibility with ISO-9660 while providing BIOS with a means of finding the location on the CD that contains the material to be booted. The format is detailed in an appendix hereto (APPENDIX).

Figure 7:
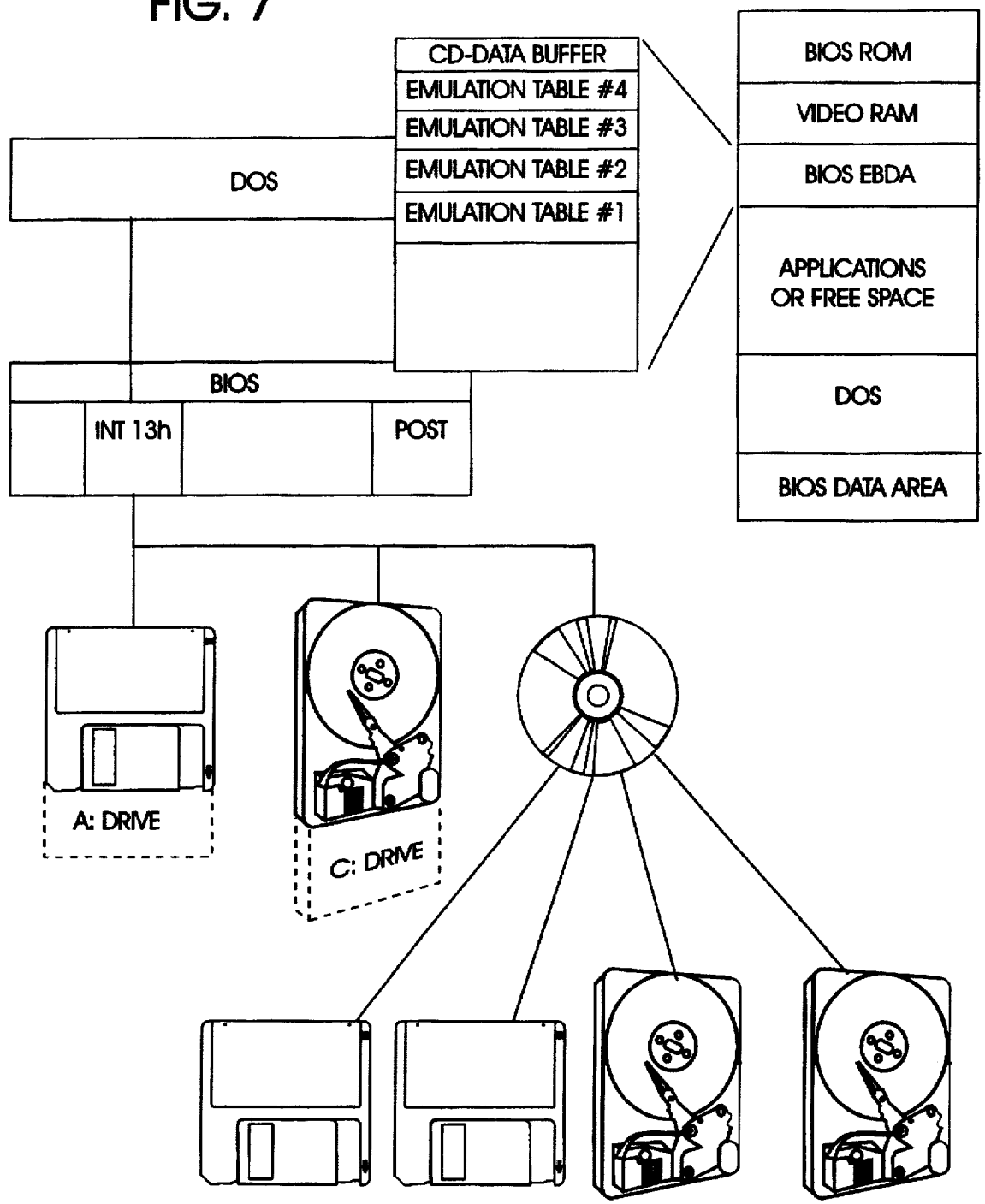
FIG. 7 is a diagram showing multiple emulation tables residing in BIOS EBDA in accordance with an aspect of the invention.

With reference to FIG. 7, multiple emulation CD-ROM images are made available to the user through multiple emulation tables added in accordance with the invention to the BIOS EBDA, four being illustrated in the present example. Each of these tables is dynamically associated with a logical drive letter. The table provides the translation necessary to map the logical drive to a selected image on the medium. An example of a device table is as follows:

| SpSize | db | ? | ;set if table active |
|---|---|---|---|
| SpMediaType | db | ? | |
| SpDrive | db | ? | ;logical drive |
| SpController | db | ? | |
| SpLba | dd | ? | ;physical location on medium |
| SpLun | db | ? | |
| SpBus | db | ? | |
| SpCacheSegment | dw | ? | |
| SpLoadSegment | dw | ? | |
| SpLoadCount | dw | ? | |
| SpCylinder | db | ? | ;physical mapping information |
| SpSector | db | ? | |
| SpHead | db | ? | |
| TotalSectors | dd | ? | |
| SectCylinder | dw | ? | |
| MediaChange | db | ? | ;set if medium has changed |
| LockCount | db | ? | ;logical media lock |
| BootOffset | dw | ? | ;location of boot sector |
| | dw | ? | ;contains cipher key | wherein the "Sp" prefix designates "specification," db, dw and dd represent byte, word and double word, respectively, and a "?" indicates a reservation in main memory.

Each table describes all the characteristics of a CD-ROM image to be emulated, such as size, media type, and format entities peculiar to hard drive and diskette media. The final entry in the table is a cipher key used in conjunction with file decryption at BIOS level as described in the copending application entitled DATA PROCESSOR HAVING BIOS DECRYPTION OF EMULATED MEDIA IMAGES. BIOS, by activating any table per the El-Torito specification (describing only single emulation table implementation) INT 13 Function 4A, can determine which drive is being emulated, and where on the CD-ROM the emulation is to be found.

Figure 8:
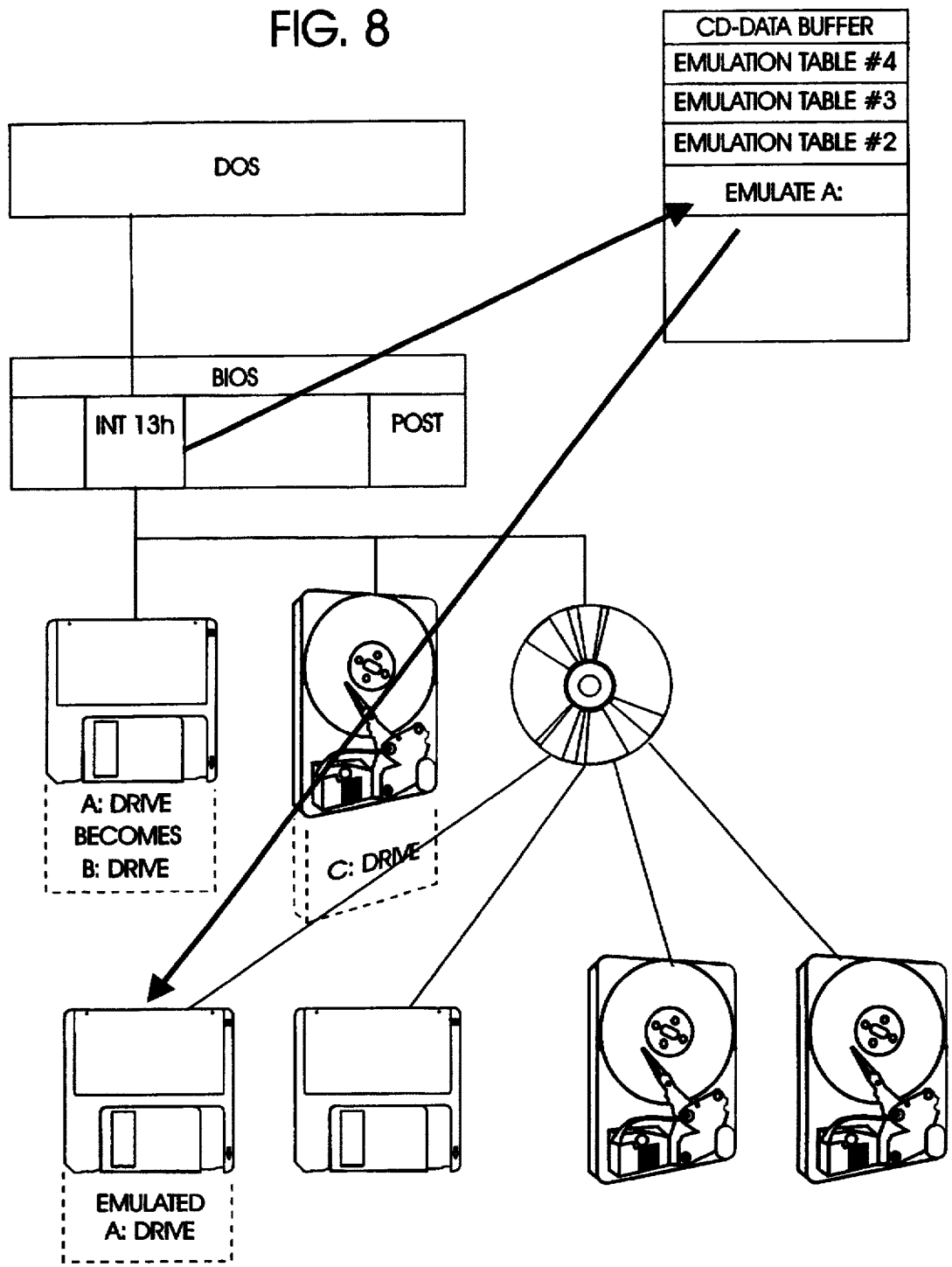
FIG. 8 shows emulation of a CD-ROM image by table activation.

With reference to FIG. 8, emulation of drive A is initiated by activation of the corresponding table by a BIOS call through INT 13, when, as mentioned previously, the physical A drive becomes renamed as the B drive, the A drive having been replaced by the emulation.

Figure 10:
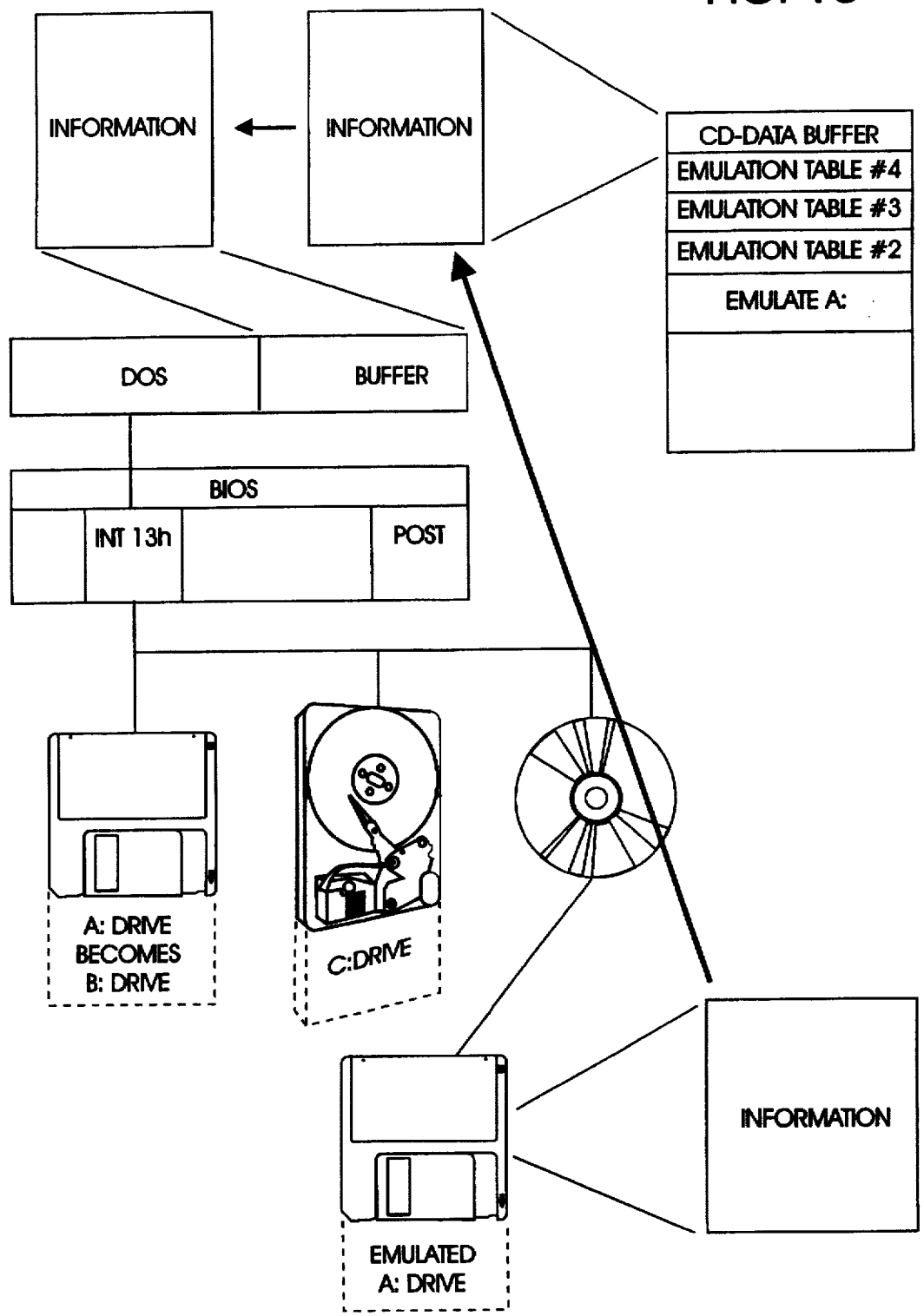
FIG. 10 is a diagram showing flow of data during CD emulation of drive A.

Data flow under this condition is as follows. Referring to FIG. 10, file data is being read from emulated A drive on the CD-ROM, is sent to the CD data buffer within the BIOS EBDA, and from there transferred to a buffer within the operating system, in this example, DOS. Other buffers may also contain data read from the other emulations, as follows.

Figure 9:
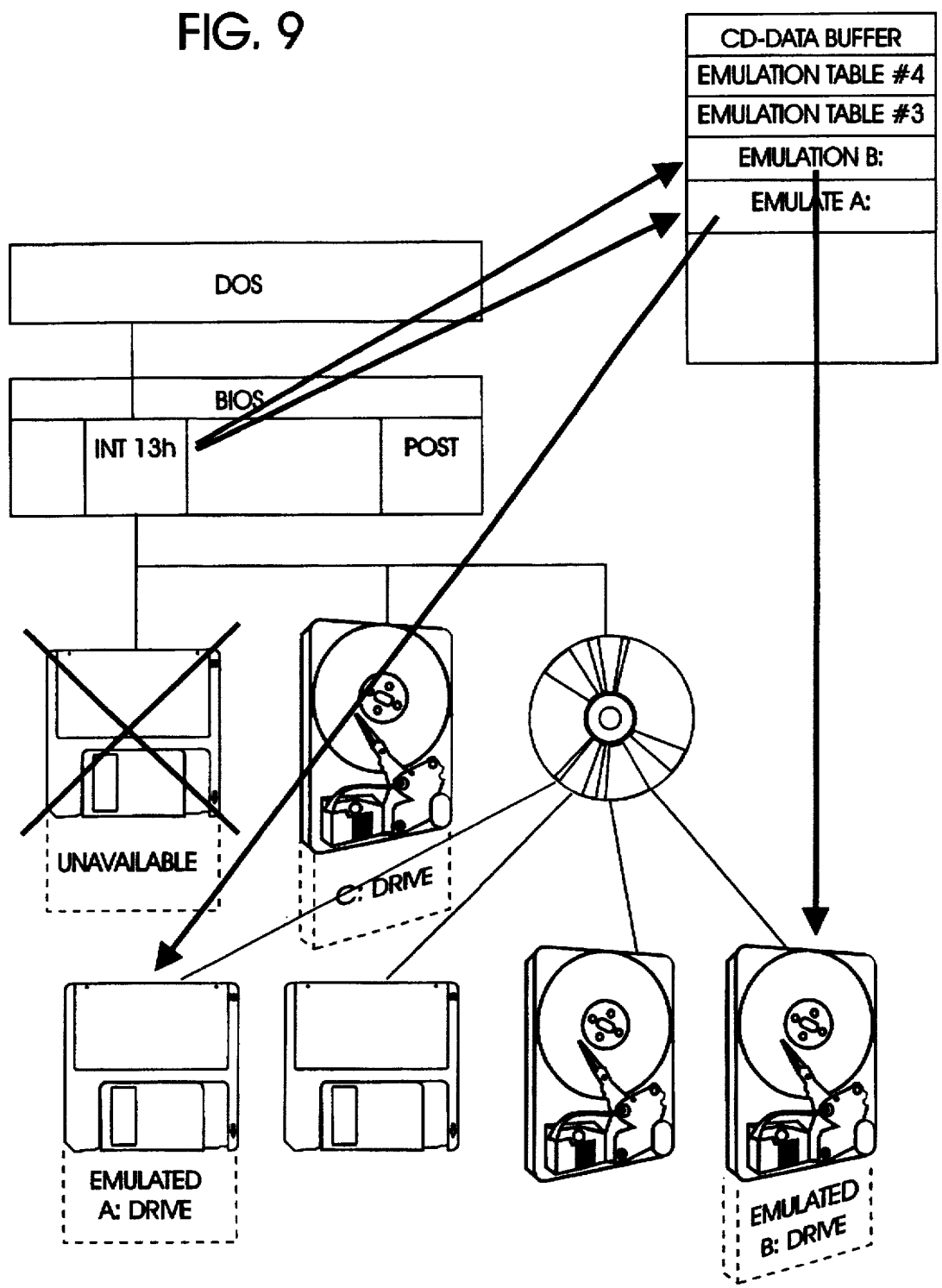
FIG. 9 shows multiple table activation to emulate two drives simultaneously as provided by the present invention.

With the A drive emulation remaining active, the BIOS table for emulation B is next activated as shown in FIG. 9, so that both drive images remain accessible to the user at the same time, without requiring a reboot. In this case a hard drive image emulation replaces the physical B drive which becomes unusable.

If the operating system is DOS, emulation must be started or stopped only on a floppy emulation or other drive recognized by DOS, not on a hard drive emulation, as under DOS a hard drive cannot be dynamically removed or replaced. Only valid operating system images can be emulated by BIOS, that is, the master boot record or partition boot record must contain a valid BIOS parameter block. Furthermore, emulation should not be changed on the initial boot drive, as when DOS initially boots, it assigns the location of critical system programs, such as COMMAND-.COM. During operation, these programs may need to be reloaded. If they are no longer present at their initial boot locations, catastrophic failures can occur.

There has accordingly been described a BIOS configured to boot from an installed CD-ROM storing multiple operating systems in different partitions of the medium. The computer is initially booted from a user selected or default partition emulating a logical drive. With the original boot partition maintained active, emulation of additional partitions as other drives is performed when needed. This is accomplished in BIOS with multiple device tables, each dynamically associated with a logical drive letter. Hence, the system files found in only the original boot partition remain available to the system when other logical drives are called.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

APPENDIX

Bootable CD-ROM Format

This format maintains compatibility with ISO-9660 while providing BIOS with a simple way of getting the location on the CD that contains material to be booted.

Boot Record Volume Descriptor

ISO-9660 defines that a "Primary Volume Descriptor" must reside at sector 10 (relative to the start of the session), followed by any number of other Volume Descriptors, followed by a "Volume Descriptor Set Terminator". The El Torito Bootable CD Specification builds on the format by requiring a "Boot Record" Volume Descriptor as defined in section 8.2 of ISO-9660. Refer to Table 1.

| Table 1. Boot Record Volume Descriptor | | |
|---|---|---|
| Offset | Type | Description |
| 0 | Byte | Boot Record Indicator, must be 00h |
| 1-5 | Byte | ISO-9660 Identifier, must be "CD001" |
| 6 | Byte | Version, must be 01h |
| 7-38 (7-26h) | Byte | Boot System Identifier, must be "EL TORITO SPECIFICATION" padded with 0's on the right. (ASCIIZ) |
| 39-70 (27h-46h) | Byte | Unused, must be spaces (20h) |
| 71-74 (47h-4Ah) | Dword | Pointer to first RBA of Boot Catalog. (Intel format) |

This "Boot Record" must reside at sector 17 in the last session on the CD. The Boot Record contains a pointer to the Boot Catalog.

Boot Catalog

The Boot Catalog is a collection of 32 byte entries. There is no limit to the number of entries in the Boot Catalog.

This catalog allows the system to pick a proper boot image and then to boot from the selected image. The image will be virtualized into a proper A:, C:, or D: drive.

Validation Entry

This must be the first entry in the Boot Catalog. This entry validates that a booting catalog is present on the disk and identifies the manufacturer of the CD. If this entry is valid, it is assumed that the rest of the entries are valid.

| Table 2. Boot Catalog Validation Entry | | |
|---|---|---|
| Offset | Type | Description |
| 0 | Byte | Header ID, must be 01h |
| 1 | Byte | Platform ID<br>0 = 80x86<br>1 = Power PC<br>2 = Mac |
| 2-3 | Word | Reserved, must be 0000h |
| 4-27 (4-1Bh) | Byte | Manufacturer / developer of the CD-ROM |
| 28-29 (1Ch-1Dh) | Word | Checksum. The sum of all of the words in this record must be 0000h. |
| 30 (1Eh) | Byte | Signature. Must be 55h. This value is included in the checksum. |
| 31 (1Fh) | Byte | Signature. Must be AAh. This value is included in the checksum. |

Initial/Default Entry

This entry is used to validate and locate the default boot image used by BIOS.

Table 3. Boot Catalog Boot Image Entry

| Offset | Type | Description |
|---|---|---|
| 0 | Byte | Boot Indicator<br>88h = Bootable<br>00h = Not Bootable |
| 1 | Byte | Boot media type. This specifies what media the boot image is intended to emulate in bits 0-3 as follows:<br>000 - No emulation[3]<br>001 - 1.2 meg diskette<br>010 - 1.44 meg diskette<br>011 - 2.88 meg diskette<br>100 - Hard file<br>101 - Reserved<br>110 - Reserved<br>111 - Reserved<br>Bit 4 is reserved<br>Bit 5 is set if a Section Entry Extension follows<br>Bits 6-7 are reserved and must be 0 |
| | | Note: Hard file images must have the number of sectors per track evenly divisible by 4. That is, the partition table and the partition boot record must begin on a CD-ROM block boundary (4 sectors). |
| 2-3 | Word | Load Segment. This is the load segment for the initial boot image. If this value is 0, the system will use the traditional segment of 7C0h |
| 4 | Byte | System Type. This byte describes the partition table in the boot image. This value is a copy of the value found in the boot image Partition Table. |
| 5 | Byte | Reserved, must be 00h |
| 6-7 | Word | Sector count. This is the number of 512 byte sectors the system will store at Load Segment during the initial boot procedure. |
| 8-11 (8-0Bh) | Dword | Load RBA. This is the start address of the virtual disk on the CD-ROM. |
| 12 (0Ch) | Byte | Selection Criteria type. This defines a vendor unique format for bytes 0Dh-1Fh.<br>0 - No selection criteria<br>1 - Language and version (IBM)<br>2-FFh - Reserved |
| 13-31 (0Dh-1Fh) | Byte | Vendor unique selection criteria. |

---

[3] Only valid DOS images can be emulated by BIOS. That is, the Master Boot Record or Partition Boot Record must contain a valid BIOS Parameter Block.

Section Header

The section header has an ID string which may be used to help select one of the entries that follow. The selected entry can then be used as a reboot image or as an emulated drive.

Table 4. Boot Catalog Section Header

| Offset | Type | Description |
|---|---|---|
| 0 | Byte | Header Indicator. <br> 90h - Header, more headers follow <br> 91h - Final Header |
| 1 | Byte | Platform ID <br> 0 = 80x86 <br> 1 = Power PC <br> 2 = Mac |
| 2-3 | Word | Number of section entries following this header. |
| 4-31 (4-1Fh) | Byte | ID String. |

Section Entry

Section Entries follow a Section Header. This entry is the same as described in Table 3 on page 7. If the 19 bytes provided for selection criteria are insufficient, a Section Entry Extension can be added by setting bit 5 of byte 1.

Section Entry Extension

This entry may follow a Section Entry. This extension identifies additional selection criteria when the 19 bytes provided by the Section Entry are insufficient. Several Section Entry Extensions may be chained together by setting bit 5 of byte 1 for as many Extensions as necessary. The final extension must have bit 5 clear (set to 0) to indicate that no more Extensions follow.

Table 5. Boot Catalog Section Entry Extension

| Offset | Type | Description |
|---|---|---|
| 0 | Byte | Header Indicator. Must be 44h. |
| 1 | Byte | Bit 5 is set if another Section Entry Extension follows. Bits 1-4 and 6-7 unused |
| 2-31 (2-1Fh) | Byte | Vendor unique selection criteria. |

INT 13h BIOS Functions

The following sections describe the INT 13h calls as they are emulated by the CD-ROM BIOS. Most function calls use DL as a drive identifier. Bit 7 is used to differentiate between a hard file and diskette. If bit 7 is zero (0), the call functions as an emulated diskette call:

```
DL=00 - Drive A:
DL=01 - Drive B:
```

If bit 7 is set (1), the call is for an emulated hard file:

```
DL=80 - Drive C:
DL=81 - Drive D:
```

These emulated functions provide access to a CD-ROM emulated drive as if it were an actual diskette or hard file. Some function calls are slightly different depending on the type of drive being emulated. The primary difference is in the location of the last return status.

40:41 is used to save the status of the last diskette operation.

40:74 is used to save the status of the last hard file operation.

Other functional differences are noted in individual sections.

Return Status

Completion status is returned in AH. Carry will also be set if the return status is non zero.

Table 6. Status of Operation

| AH | Description |
|---|---|
| 00h | No error |
| 01h | Invalid parameter |
| 03h | Write-protect error |
| 04h | Requested sector not found |
| 05h | Reset failed |
| 06h | CD has been changed |
| 0Ch | Media type not found |
| 20h | General Failure |
| 31h | No media in drive |
| 32h | Media type not supported |
| 80h | Timeout |
| AAh | Drive not ready |
| B0h | Media not locked in drive |
| B1h | Media locked in drive |
| B2h | Media not removable |
| B3h | Media in use |
| B4h | Lock count exceeded |
| B5h | Valid eject request failed |
| BBh | Undefined error occurred |
| CCh | Write fault |
| E0h | Status Error |
| FFh | Sense operation failed |

Emulation of Existing Functions

AH=00h - Reset Disk(ette) System
    Handled by "real" BIOS.

Note: The ATAPI and/or SCSI CD-ROM devices are not reset.

AH=01h - Read Status of Last Operation
    Handled by "real" BIOS.

AH=02h - Read Sectors
    Entry:
        AL-Number of sectors
        CH-Cylinder number (low 8 bits)
        CL-Sector, bits 6-7=High order cylinder
        DH-Head
        DL-Drive
        ES:BX-Buffer address
    Return:
        AH-Status
        AL-Actual number of sectors read

AH=03h - Write Sectors
    Entry:
        AL-Number of sectors
        CH-Cylinder number (low 8 bits)
        CL-Sector, bits 6-7=High order cylinder
        DH-Head
        DL-Drive
        ES:BX-Buffer address
    Return:
        AH-Status (Write Protect)
        AL-Actual number of sectors written

AH=04h - Verify Sectors
    Entry:
        AL-Number of sectors
        CH-Cylinder number (low 8 bits)
        CL-Sector, bits 6-7=High order cylinder
        DH-Head
        DL-Drive
        ES:BX-Buffer address
    Return:
        AH-Status
        AL-Actual number of sectors written

AH=05h - Format Track
    Write Protect error.

AH=06h - Format Track and Set Flags
Write Protect error.

AH=07h - Format Drive
Write Protect error.

AH=08h - Read Drive Parameters
Entry:
    DL-Drive

Return:
    AH-Status
    AL-0
    BH-0
    BL-0
    CH-Max cylinder number (low 8 bits)[a]
    CL-Max sector, bits 6-7=High order cylinder
    DH-Max Head[a]
    DL-Number of diskette drives installed
    ES:DI-Pointer to 11 byte parameter table
    Defined at INT 1Eh (Diskette only)

AH=09h Initialize Drive Pair Characteristics
Handled by "real" BIOS.

AH=0Ah to 0Bh - Reserved

AH=0Ch - Seek
Entry:
    CH-Cylinder number (low 8 bits)
    CL-Sector, bits 6-7=High order cylinder
    DH-Head
    DL-Drive
    ES:BX-Buffer address Return:
    AH-Status

AH=0Dh Alternative Disk Reset
Handled by "real" BIOS.

AH=0Eh to 0Fh - Reserved

AH=10h - Test Drive Ready
Entry:
    DL-Drive

Return:
    AH-Status

---

[a] These values are maximums, not quantity.

AH=11h - Recalibrate
    Entry:
        DL-Drive
    Return:
        AH-Status

AH=12h to 14h - Reserved

AH=15h - Read Drive Type
    Entry:
        DL-Drive
    Return:
        AH-Drive type
            2-Diskette with change line available
            3-Hard File
        CX,DX-Total number of sectors (Hard file only)

AH=16h - Change Status
    Entry:
        DL-Drive
    Return:
        AH-Change Status
            0-No change
            1-Invalid parameter
            6-CD has been changed
            80h-Not ready

AH=17h - Set Diskette Type for Format
    Write Protect error.

AH=18h - Set Media Type for Format
    Write Protect error.

AH=19h - Park Heads
    Entry:
        DL-Drive
    Return:
        AH-Status

AH=1Ah to 24h - Reserved

AH=25h - Identify Drive
    Entry:
        DL-Drive
        ES:BX-Address of 512 byte buffer
    Return:
        AH-Status If the operation is successful, the buffer will contain the first 512 bytes returned by the ATAPI Identify Drive command.

AH=26h to 40h - Reserved

Emulation of Extended Functions

The basic data structure for this interface is the Disk Address Packet which is based on an absolute block number.

Table 7. Disk Address Packet

| Offset | Type | Description |
|---|---|---|
| 0 | Byte | Packet size. This field contains the size, in bytes, of the disk address packet, including the size of this field. Must be at least 16 (10h). Sizes greater than 16 are not rejected. |
| 1 | Byte | Reserved. Must be set to 0. |
| 2-3 | Word | Block Count. On input, this field contains the number of blocks that are to be transferred. On output, it contains the number that were actually transferred. |
| 4-7 | Dword | Buffer Address. Segment:offset address of the buffer that data is to transferred to or from. |
| 8-11 | Dword | Block Number (low). |
| 12-15 | Dword | Block Number (high). The block number refers to the absolute block number from the beginning of the disk. The first block in numbered 0. This is an emulated value and is actually relative to the actual beginning of the emulation area on the CD. |

AH=41h - Check for Extension Support
```
Entry:
        BX=55AAh (not checked)
        DL-Drive
Return:
        AH-Major version (01h)
        AL-Minor version (01h)
        BX=AA55h
        CX=3, Removable media is supported
              Extended access is supported
```

AH=42h - Extended Read
```
Entry:
        DL-Drive
        DS:SI-Disk Address Packet
Return:
        AH-Status
```

AH=43h - Extended Write
```
Entry:
        AL-0=Verify off,1=verify on
        DL-Drive
        DS:SI-Disk Address Packet
Return:
        AH-Status (Write protect error)
```

AH=44h - Extended Verify
　　Entry:
　　　　DL-Drive
　　　　DS:SI-Disk Address Packet
　　Return:
　　　　AH-Status

AH=45h - Lock/Unlock Drive
　　Entry:
　　　　AL=0-Lock media in drive
　　　　AL=1-Unlock media in drive
　　　　AL=2-Return lock/unlock status
　　　　DL-Drive
　　　　DS:SI-Disk Address Packet
　　Return:
　　　　AH-Status x AH=46h - Eject/Load Media
　　Entry:
　　　　AL=0-Eject media
　　　　AL=1-Load media
　　　　DL-Drive
　　　　DS:SI-Disk Address Packet
　　Return:
　　　　AH-Status

AH=47h - Extended Seek
　　Entry:
　　　　DL-Drive
　　　　DS:SI-Disk Address Packet
　　Return:
　　　　AH-Status

AH=48h - Extended Get Drive Parameters
　　Entry:
　　　　DL-Drive
　　　　DS:SI-Buffer address
　　Return:
　　　　AH-Status

| Table 8. Drive Parameters Buffer Content | | |
|---|---|---|
| Offset | Type | Description |
| 0-1 | Word | Buffer Size, in bytes, of the buffer that is passed in and returned, including the size of this field. The size of the returned buffer cannot be larger than the size of the passed in buffer. |
| 2-3 | Word | Flags 0110111b.<br>Bit   Meaning<br>+ 0-BIOS handles boundary errors<br>+ 1-Cyl,Head,Sect Info is valid<br>+ 2-Removable media<br>- 3-Supports Write Verify (4301h)<br>+ 4-Change Line Supported<br>+ 5-Lockable<br>- 6-1 = Media values are max, 0 = Real |
| 4-7 | Dword | Cylinders per disk |
| 8-11 (8-0Bh) | Dword | Heads per drive |
| 12-15 (0Ch-0Fh) | Dword | Sectors per track |
| 16-19 (10h-13h) | Dword | Sectors per drive (low) |
| 20-23 (14h-17h) | Dword | Sectors per drive (high) |
| 24-25 (18h-19h) | Word | Sector size (in bytes) |

AH=49h - Get Extended Disk Change Status

```
Entry:
        DL-Drive
Return:
        AH-Change Status
        0-No change
        1-Invalid parameter
        6-CD has been changed
        80h-Not ready
```

CD-ROM Specific Functions

The basic data structure for this interface is the Specification Packet.

Table 9. Specification Packet

| Offset | Type | Description |
|---|---|---|
| 0 | Byte | Packet size. Must be 19 (13h) |
| 1 | Byte | Flags. This specifies what media the boot image is intended to emulate in bits 0-3 as follows:<br>000 - No emulation<br>001 - 1.2 meg diskette<br>010 - 1.44 meg diskette<br>011 - 2.88 meg diskette<br>100 - Hard file<br>101 - Reserved<br>110 - Reserved<br>111 - Reserved<br>Bit 4-5 reserved, must be 0<br>Bit 6 is set if this is an ATAPI CD-ROM emulation<br>Bit 7 is set if this is a SCSI CD-ROM emulation |
| 2 | Byte | Drive number. This is the drive number on which emulation is being initiated or terminated. |
| 3 | Byte | Controller Index. For ATAPI emulation, this is set to 0 for the primary controller or 1 for the secondary. For SCSI, ...? |
| 4-7 | Dword | Logical Block Address (LBA) for the image to be emulated. |
| 8 | Byte | For ATAPI, this is set to 0 for the master device or 1 for the slave. For SCSI, this is the LUN and PUN of the CD drive. |
| 9 | Byte | For ATAPI, this is set to 0. For SCSI, this the BUS number |
| 10-11 (0Ah-0Bh) | Word | User buffer segment. If this field is non-zero, it specified the segment of a user supplied 3K buffer for caching CD reads. The buffer begins at segment:0. |
| 12-13 (0Ch-0Dh) | Word | Load Segment. This is the load address for the boot image. If this value is zero, the default 07c0h segment will be used. (Only valid for function 4Ch.) |
| 14-15 (0Dh-0Fh) | Word | Sector Count. This is the number of 512 byte sectors that will be stored at "Load Segment" during the initial boot procedure. (Only valid for function 4Ch.) |
| 16 (10h) | Byte | Cylinder. This is the same as the value returned in CH when function 8 is invoked. |
| 17 (11h) | Byte | Sector. This is the same as the value returned in CL when function 8 is invoked. |
| 18 (12h) | Byte | Head. This is the same as the value returned in DH when function 8 is invoked. |

AH=4Ah - Initiate Disk Emulation

Entry:
```
AL=0 - Initiate disk emulation
AL=1 - Initiate disk emulation with decryption
        BX+CX=decryption key DS:SI-Specification Packet
```
Return:
```
AH-Status
```

Note: If the LBA is greater than 17 (11h), it is the offset to the first sector of the image to be emulated. If the LBA is less than 17 (11h), it will be used as an index into the Boot Catalog and this field will be filled in with the actual starting offset. If the value is 0, the default image will be selected. If 1, the first selectable bootable image will be selected. If 2, the second bootable image, and so on.

Warning: If you are emulating a hard file image as a diskette, you may encounter problems with DOS. Refer to Appendix A, "Emulating a Hard File Image as A Diskette" on page 23 for more information.

Emulation Do's and Don't

- Do not start emulation for a drive that was not present at initial boot time. BIOS will emulate the drive but DOS will not provide access.

- Do not start or stop emulation for a hard file. DOS considers hard files as non-removable media and will not refresh its operating parameters.

- Do emulate hard file images as diskettes but refer to Appendix A, "Emulating a Hard File Image as A Diskette" on page 23 for more information.

Note: It is OK to change the emulation image using "AH=4Ah - Initiate Disk Emulation" without first issuing "AH=4Bh - Terminate Disk Emulation" on page 20. The initial access to the emulated drive, after changing the emulation image, will return a "Disk Change Line" status. This is necessary to cause DOS to refresh its operating parameters x AH=4Bh - Terminate Disk Emulation
```
Entry:
    AL=0-Terminate
    AL=1-Return status for first emulation
    AL=2-Return status for specified drive
    AL=3-Controller presence check
    DL-Drive
    DS:SI-Empty Specification Packet
Return:
    AH-Status
    DS:SI-Completed Specification Packet
```

AL=2 (Return status for specified drive) will return a filled in specification packet for the drive specified in DL. If the drive is not emulated, an error is returned.
AL=1 (Return status for first emulation) ignores DL and returns a filled in specification for the first (IPL) drive emulated. If the drive is not emulated, a Not Ready error (AAh) is returned.

Note: Emulation termination is actually delayed until the next read or status check is issued. A Disk Change Status will then be returned to cause DOS to refresh parameters for the non-emulated drive.

Figure 5:
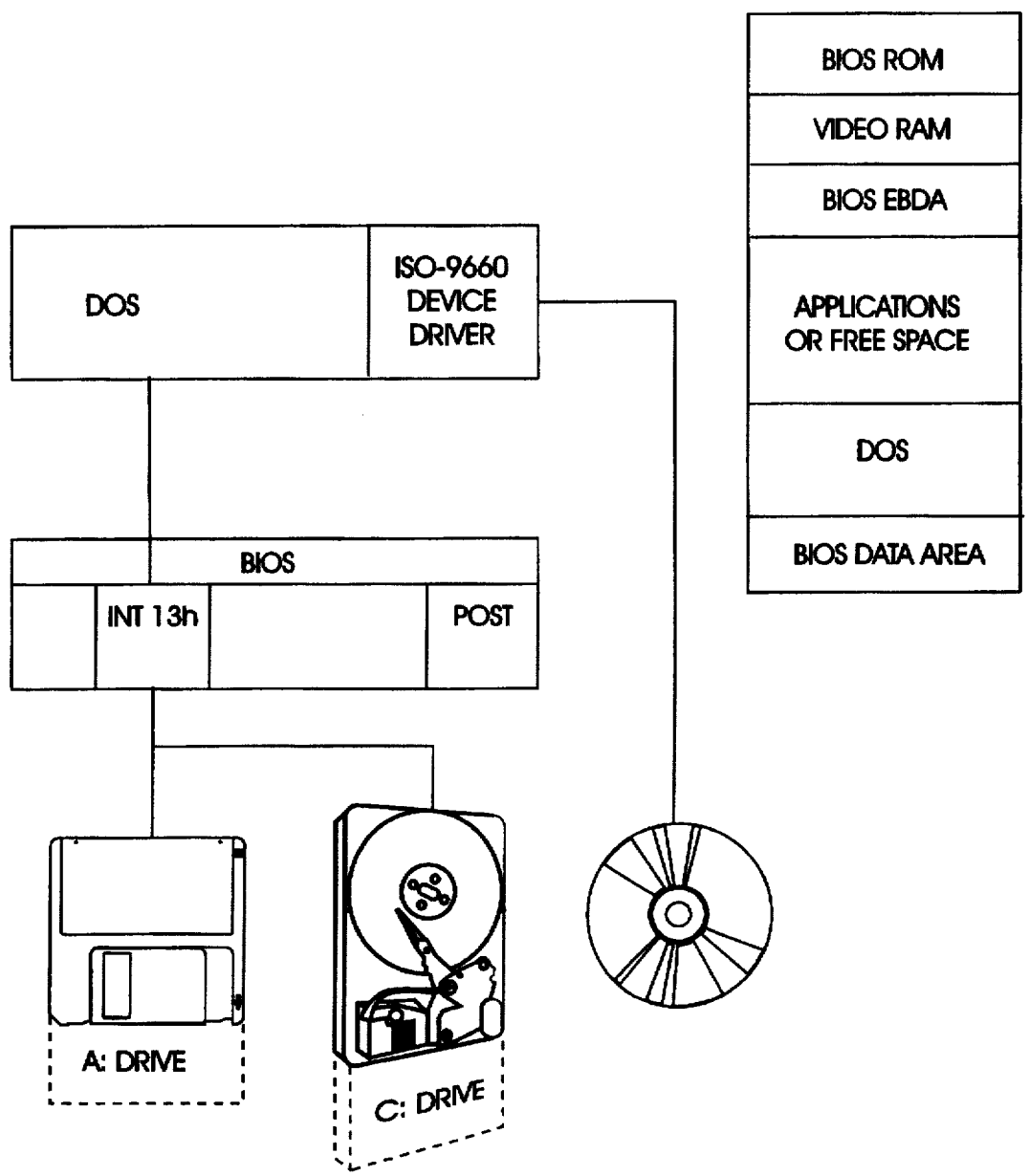
FIG. 5 is a diagram of the ISO-9660 operating environment upon which the invention is optionally based.
Figure 6:
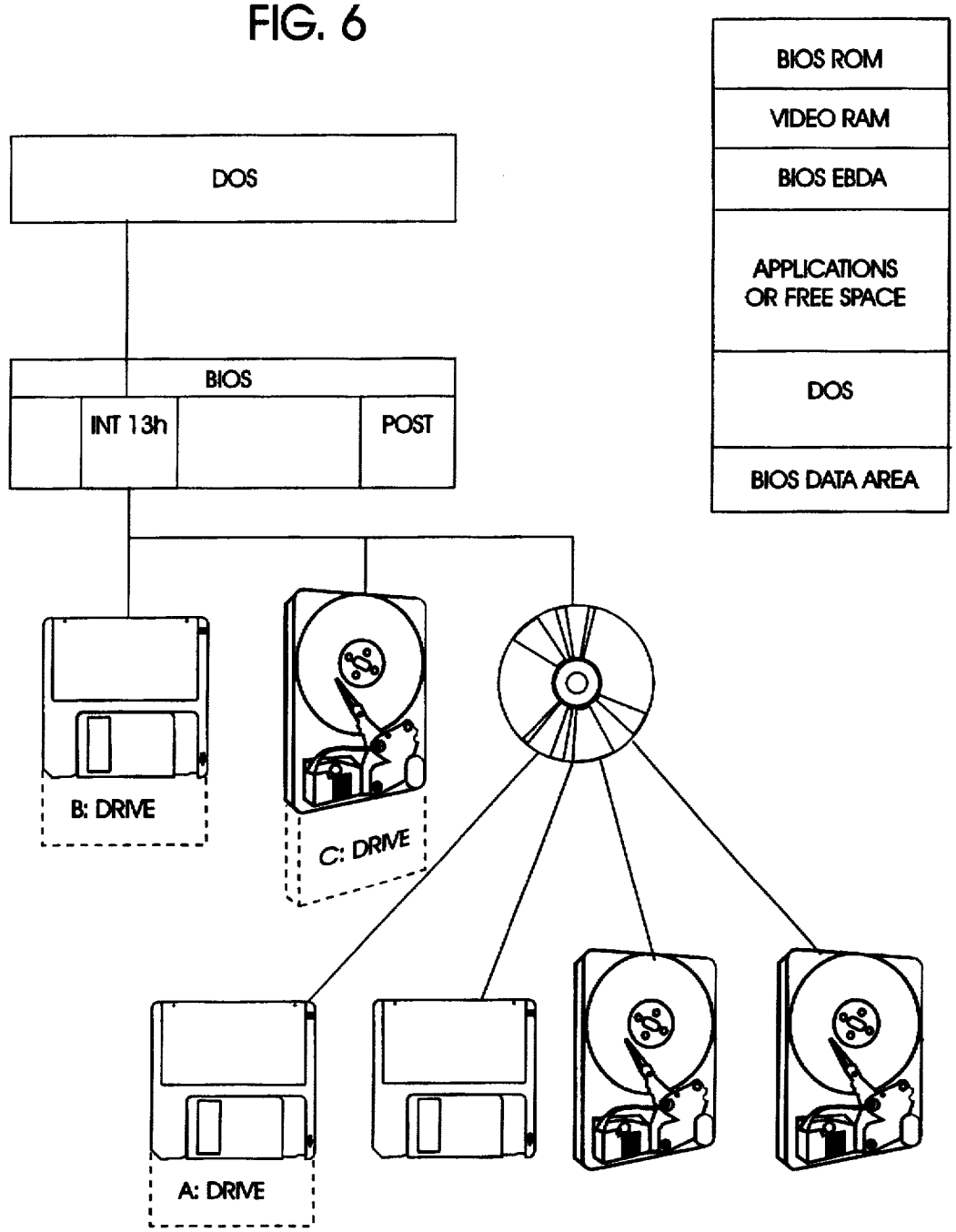
FIG. 6 is a diagram showing BIOS implementation of multiple CD-ROM image emulation per the El Torito specification.

Warning: If you have previously used the I/O Control for Devices (IOCTL) DOS command to change emulation parameters, you may need to restore DOS to its default operation. To do this, use the procedure shown in Figure 4 on page 24 to get the current parameters. Then, set the first byte of PACKET to 0 and use the procedure shown in Figure 5 on page 24. Setting the first byte to zero returns to defaults.

Warning: If you terminate emulation on the boot drive, DOS may terminate with a catastrophic failure.

AH=4Ch - Initiate Disk Emulation and Boot
```
Entry:
    AL=0 - Initiate emulation and re-boot
    AL=1 - Initiate emulation and re-boot with decryption
            BX+CX=decryption key
    AL=2 - Reboot with current emulation
    AL=3 - Reboot with no emulation
    DL=Drive
    DS:SI-Specification Packet
Return:
    AH-Status if operation failed
    No return if successful
```

Note: The drive specifications for this command are only used to establish whether or not the image is bootable. If bootable, the system will be reset and the image will be booted as the drive specified by its BPB.

x AH=4Dh - Read Boot Catalog

```
Entry:
        AL=0-Read Boot Catalog
        AL=1-Read TOC
        AL=2-Read Absolute
        DL-Drive
        DS:SI-Disk Address Packet
        (not Specification Packet)
Return:
        AH-Status if operation failed
        No return if successful
```

Note: All Disk Address Parameters are given in units of 512 byte sectors. To read a CD block (2048 bytes) using AL=2 (Absolute Read), you must provide a starting sector number (512 bytes) relative to the beginning of the CD-ROM. If you are using LBA or CD block numbers, you must multiply by 4 to get the correct starting value.

| Table 10. EBDA RAM Requirements | | |
|---|---|---|
| Name | Size | Description |
| CdRamStart | Equate | Defines the starting offset of CD-ROM's RAM |
| CdRamLength | Equate | Defines the size in bytes of work area |
| SpecPacketA | 32 bytes | Specification packet and device work area for the first emulation drive. |
| SpecPacketB | 32 bytes | Specification packet and device work area for the second emulation drive. |
| SpecPacketC | 32 bytes | Specification packet and device work area for the third emulation drive. |
| SpecPacketD | 32 bytes | Specification packet and device work area for the fourth emulation drive. |
| SpecPacketBase | Word | Base offset to the current emulation packet. |
| AtapiScsi | Byte | IDE/SCSI switch. Zero indicates command is for SCSI, non-zero is for IDE. |
| EmulationActive | Byte | Number of active specification packets. This is the number of drives being emulated. |
| Controller | Word | IDE controller number base-0. |
| DriveBase | Word | Base IDE controller address. |
| buffer_length | Word | Number of data bytes in data_buffer. |
| rw_sect | DWord | The logical sector to read base-0, low order byte first. |
| buffer_content | 3 Words | Defines the current content of data_buffer. This provides a small (four sector) cache for reads. The first word is a controller ID, the next two words are the physical CD-ROM LBA. |
| bios_int13 | DWord | Segment:Offset of next routine in the INT 13h chain. |
| cd_entry_ds | Word | Save area for DS on initial entry to INT-13 extensions. The stack is not used in order to maintain integrity in the event the command must be passed on to the INT 13h chain. |
| cd_entry_es | Word | Save area for ES on initial entry to INT-13 extensions. The stack is not used in order to maintain integrity in the event the command must be passed on to the INT 13h chain. |
| DriveRemap | Word | Used to remap existing physical drives A: or C: to B: or D:. Low byte is "from" drive, high byte is "to" drive. |
| read_cd | 2 Bytes | Command used to read a CD block. |
| lba | 6 Bytes | The Logical Block Address to read high order byte first. |
| numlba | 4 Bytes | Number of LBA's to read. |
| Note: READ_CD, LBA, and NUMLBA definitions must be concatenated. The entire sequence is treated as a single command to the CD. | | |
| data_buffer | 2048 Bytes | CD-ROM Data buffer |

EBDA RAM Requirements

These definitions are for the "generic" CD-ROM BIOS emulation as well as the low level code necessary to interface to IDE ATAPI devices. Requirements to add SCSI low level device support are TO BE DETERMINED.

Structure Definitions

To assemble properly with version 6.0 or later of the assembler, you must use

OPTION OLDSTRUCTS with these structure definitions. In addition, these definitions cannot be included in BIOSDATA.ASM due to a conflict with existing NEWSTRUCTS definitions. Space for the structure(s) must be allocated manually.

Emulation Specification Packet

```
SpecPacketSize   equ    13h              ;19d

SpecificationPacket     struc
SpSize           db     ?
SpMediaType      db     ?
SpDrive          db     ?
SpController     db     ?
SpLba            dd     ?
SpLun            db     ?
SpBus            db     ?
SpCacheSegment   dw     ?
SpLoadSegment    dw     ?
SpLoadCount      dw     ?
SpCylinder       db     ?
SpSector         db     ?
SpHead           db     ?
;****  Below are extensions for BIOS implementation
TotalSectors     dd     ?                ;23d
SectCylinder     dw     ?                ;25d
MediaChange      db     ?                ;26d
LockCount        db     ?                ;27d
BootOffset       dw     ?                ;29d <-- 32 is max
SpecificationPacket     ends
```

Boot sector content definition

```
bpb struc
            db      3 dup(?)    ;JMP instruction + NOP
            db      8 dup(?)    ;product name and version
    BpbBs       dw      ?           ;bytes per sector
    BpbAuSect   db      ?           ;sectors per allocation unit
    BpbRsvd     dw      ?           ;reserved sectors
    BpbFats     db      ?           ;number of FATs
    BpbDirEnts  dw      ?           ;max number of root directory entries
    BpbTs       dw      ?           ;total number of sectors
    BpbMedia    db      ?           ;media descriptor
    BpbFatSects dw      ?           ;number of sectors occupied by FAT
    BpbSt       dw      ?           ;sectors per track
    BpbHd       dw      ?           ;number of heads
    BpbHidden   dw      ?           ;number of hidden sectors
                dw      ?           ;reserved
    BpbTs3      dd      ?           ;V3 ext - total number of sectors
    BpbDrive    db      ?           ;ipl drive ID
    BpbHead     db      ?           ;ipl head ID
                db      ?           ;signature
                db      4 dup(?)    ;volume serial number
                db      19 dup(?)
bpb ends
```

Master Boot Record Content Definition

```
MasterBoot struc
                db      446 dup(?)  ;Boot Record Program
    Partition1  db      16 dup(?)   ;First partition table
    Partition2  db      16 dup(?)   ;Second partition table
    Partition3  db      16 dup(?)   ;Third partition table
    Partition4  db      16 dup(?)   ;Fourth partition table
    Signature   dw      ?           ;55AAh
MasterBoot ends
```

Partition Table Content Definition

```
PartitionTable struc
    PtBoot          db      (?)     ;0=inactive,80h=active
    PtBootHead      db      (?)
    PtBootSector    db      (?)
    PtBootCylinder  db      (?)
    PtSystem        db      (?)     ;0=unused,etc.
    PtEndHead       db      (?)
    PtEndSector     db      (?)
    PtEndCylinder   db      (?)
    PtOffset        dd      (?)     ;offset from beginning of disk in sectors
    PtLength        dd      (?)     ;number of sectors allocated
PartitionTable ends
```

Directory Entry Content Definition

```
DirEntry    struc
DirName         db      8 dup(?)    ;file name
DirExt          db      3 dup(?)    ;file name extension
DirAttribute    db      ?           ;Attribute Bit/Meaning
                                    ;           0 - Read only
                                    ;           1 - Hidden
                                    ;           2 - System
                                    ;           3 - Volume label
                                    ;           4 - Subdirectory
                                    ;           5 - Archive
                db      11 dup(?)
DirCreateTime   dw      ?           ;HHHHHMMMMMMSSSSS (s=sec/2)
DirCreateDate   dw      ?           ;YYYYYYYMMMMDDDDD (Y's=base 1980)
DirCluster      dw      ?           ;
DirFileSize     dd      ?
DirEntry    ends
```

Disk Address Packet

This packet is used for extended function calls.

```
DiskAddressPacket struc
DapSize         db      ?       ;packet size (must be at least 16)
                db      ?
DapCnt          dw      ?       ;number of blocks to transfer
DapOffset       dw      ?       ;transfer address offset
DapSegment      dw      ?       ;transfer address segment
DapBlock        dd      2 dup(?)
DiskAddressPacket ends
```

Extended parameters content

```
ExtendedParms   struc
XpSize          dw      ?
XpFlags         dw      ?
                                    Bit Meaning
                                    + 0-BIOS handles boundary errors
                                    + 1-Cyl,Head,Sect Info is valid
                                    + 2-Removable media
                                    - 3-Supports Write Verify (4381h)
                                    + 4-Change Line Supported
                                    + 5-Lockable
                                    + 6-Cyl,Head,Sect Info is max
XpCyls          dd      ?
XpHeads         dd      ?
XpSect          dd      ?
XpTotSect       dd      2 dup (?)
XpSectSize      dw      ?
ExtendedParms ends
```

What is claimed is:

1. A data processing system, comprising:

a central processing unit (CPU);

a system memory for storing data in electrical signal form;

a first port for receiving an input device generating electrical input signals;

at least one second port for supplying electrical output signals to output devices;

a BIOS included within the CPU for carrying out prescribed functions including converting operating signals developed by an operating system executed by the CPU into electrical signals compatible with devices that are responsive to other signals applied by the CPU;

a non-volatile mass storage medium storing in different partitions of the medium multiple independent applications in the form of data on respective BIOS emulated images;

a medium drive for receiving the non-volatile mass storage medium;

a system bus logically interconnecting the CPU, the system memory, the first and second ports and the medium drive for the non-volatile mass storage medium; and the BIOS configured to initially boot the data processing system from the non-volatile mass storage medium from an initial partition included in the different partitions of the non-volatile mass storage medium and the BIOS including multiple emulation tables, each dynamically associated with a logical drive, for maintaining emulations of multiple images simultaneously active upon calling another logical drive different from the logical drive associated with the initial partition to provide multiple drive images accessible to the data processing system at the same time through the initial booting process.

2. The data processing system of claim 1, wherein the BIOS configuration includes means for mapping each said associated logical drive to a selected image on the non-volatile mass storage medium.

3. The data processing system as defined in claim 1, wherein the non-volatile mass storage medium comprises a CD-ROM.

4. For a data processing system comprising a central processing unit (CPU), a system memory for storing data in electrical signal form, a first port for receiving an input device generating electrical input signals and at least one second port for supplying electrical output signals to output devices, a non-volatile mass storage medium storing multiple independent applications in different partitions of the mass storage medium in the form of data on respective BIOS emulated images, a medium drive for the non-volatile mass storage medium, and a system bus logically interconnecting the CPU, the system memory, the first and second ports and the medium drive for the non-volatile mass storage medium:

a BIOS configured for carrying out prescribed functions including converting operating signals developed by an operating system executed by the CPU into electrical signals compatible with devices that are responsive to other signals applied by the CPU to the system bus, the BIOS including an extended BIOS data area including multiple emulation tables, each emulation table being associated with and including characteristics of a corresponding logical drive and the BIOS configured to map each said corresponding logical drive to a selected image on the non-volatile mass storage medium and to maintain emulations of multiple images simultaneously active after an initial boot of the data processing system.

5. The data processing system as defined in claim 4, wherein the non-volatile mass storage medium comprises a CD-ROM.

6. A method of operating a data processing system comprising at least a central processing unit (CPU), input and output ports, a system memory for storing data in the form of electrical signals, a medium drive for writing data to and reading data from a non-volatile mass storage medium, wherein the non-volatile mass storage medium contains multiple bootable partitions emulating one or more media images, and a system bus logically interconnecting the CPU, the input and output ports, the medium drive and the system memory, and wherein the CPU includes a BIOS configured for carrying out prescribed functions, the method comprising the steps of:

converting by the BIOS operating signals developed by an operating system executed by the CPU into electrical signals compatible with devices that are responsive to signals provided by the CPU to the system bus; and enabling dynamic addition and removal of a second emulated image after an initial boot of the data processing system provides a first emulated image by storing emulation tables in an extended region of the BIOS for the first and the second emulated images, each said emulation table being associated with a corresponding logical drive and providing translation for mapping each corresponding logical drive to a selected emulated image on the non-volatile mass storage medium.

7. The method of claim 6, including reading data from the mass non-volatile storage medium comprising a CD-ROM.

8. The data processing system as defined in claim 1, wherein the multiple emulation tables included in the BIOS are included in BIOS EBDA.

* * * * *